United States Patent
Jeon et al.

(10) Patent No.: US 9,007,446 B2
(45) Date of Patent: Apr. 14, 2015

(54) THREE DIMENSIONAL DISPLAY DEVICE

(75) Inventors: Byoung Kun Jeon, Daejeon (KR);
Moon Soo Park, Daejeon (KR); Shin Young Kim, Daejeon (KR); Su Young Ryu, Daejeon (KR)

(73) Assignee: LG Chem, Ltd., Seoul (KR)

( * ) Notice: Subject to any disclaimer, the term of this patent is extended or adjusted under 35 U.S.C. 154(b) by 387 days.

(21) Appl. No.: 13/567,719

(22) Filed: Aug. 6, 2012

(65) Prior Publication Data

US 2013/0083013 A1   Apr. 4, 2013

(30) Foreign Application Priority Data

Aug. 5, 2011   (KR) .................. 10-2011-0077986

(51) Int. Cl.
*H04N 13/02* (2006.01)
*G06T 15/00* (2011.01)
*H04N 13/04* (2006.01)
*G02B 27/26* (2006.01)

(52) U.S. Cl.
CPC ............ *G06T 15/00* (2013.01); *H04N 13/0434* (2013.01); *G02B 27/26* (2013.01); *G02B 2207/123* (2013.01)

(58) Field of Classification Search
CPC .......... H04N 13/0434; H04N 13/0445; H04N 13/0429; H04N 13/0431; G02B 27/22
USPC ............. 348/51, 53–55, 57, 58; 359/463–466
See application file for complete search history.

(56) References Cited

U.S. PATENT DOCUMENTS

| 5,469,295 | A  | * | 11/1995 | Burke ........................ 359/478 |
| 7,697,204 | B2 | * | 4/2010  | Sugiyama .................... 359/465 |
| 8,284,241 | B2 | * | 10/2012 | Shestak et al. ................. 348/51 |
| 8,345,955 | B2 | * | 1/2013  | Dang et al. .................... 382/154 |
| 8,462,150 | B2 | * | 6/2013  | Jeon et al. ..................... 345/419 |
| 2005/0219357 | A1 | * | 10/2005 | Sun et al. ....................... 348/57 |
| 2011/0063424 | A1 |   | 3/2011  | Matsuhiro et al. |

FOREIGN PATENT DOCUMENTS

| CN | 102067020 A   | 5/2011  |
| JP | 2002-185983   | 6/2002  |
| JP | 2002185983 A  | 6/2002  |
| JP | 2010250257 A  | 11/2010 |
| JP | 2011-048286   | 3/2011  |
| JP | 2011048286 A  | 3/2011  |
| TW | 200839297 A   | 10/2008 |

* cited by examiner

*Primary Examiner* — Victor Kostak
(74) *Attorney, Agent, or Firm* — McKenna Long & Aldridge, LLP

(57) ABSTRACT

Provided are a display device, a film for controlling a viewing angle and an optical filter. An illustrative display device may include a display element, the film for controlling the viewing angle and a polarization control element. The display device may be a three-dimensional (3D) display device. When the illustrative display device, film for controlling a viewing angle or optical filter is used, a 3D image may be observed at a wide viewing angle without loss of brightness.

10 Claims, 17 Drawing Sheets

FIG. 4

| LS | RS | LS | RS | LS | RS |
|----|----|----|----|----|----|
| RS | LS | RS | LS | RS | LS |
| LS | RS | LS | RS | LS | RS |
| RS | LS | RS | LS | RS | LS |
| LS | RS | LS | RS | LS | RS |
| RS | LS | RS | LS | RS | LS |
| LS | RS | LS | RS | LS | RS |

FIG. 8

| LG | RG | LG | RG | LG | RG |
|----|----|----|----|----|----|
| RG | LG | RG | LG | RG | LG |
| LG | RG | LG | RG | LG | RG |
| RG | LG | RG | LG | RG | LG |
| LG | RG | LG | RG | LG | RG |
| RG | LG | RG | LG | RG | LG |
| LG | RG | LG | RG | LG | RG |

| P   | TC2 | P   | TC2 | P   | TC2 |
|-----|-----|-----|-----|-----|-----|
| TC2 | P   | TC2 | P   | TC2 | P   |
| P   | TC2 | P   | TC2 | P   | TC2 |
| TC2 | P   | TC2 | P   | TC2 | P   |
| P   | TC2 | P   | TC2 | P   | TC2 |
| TC2 | P   | TC2 | P   | TC2 | P   |
| P   | TC2 | P   | TC2 | P   | TC2 |

OBSERVER WEARING 3D GLASSES

OBSERVER WEARING 3D GLASSES

THREE DIMENSIONAL DISPLAY DEVICE

This application is a Utility Application which claims priority to and the benefit of Korean Patent Application No. 10-2011-0077986, filed on Aug. 5, 2011, which is hereby incorporated by reference in its entirety herein.

BACKGROUND

1. Field

The present application relates to a display device, a film for controlling a viewing angle and an optical filter.

2. Related Art

A three-dimensional image display device is a display device capable of delivering three-dimensional data to an observer. There are two main methods of displaying a three-dimensional image: a stereoscopic method and an autostereoscopic method. The stereoscopic method may be classified as a method using polarizing glasses or a method using LC shutter glasses, and the autostereoscopic method may be classified as a binocular/multiview binocular parallax method, a volumetric method, or a holographic method.

SUMMARY

The present application is directed to providing a display device, a film for controlling a viewing angle and an optical filter.

In one aspect, an illustrative display device may include a display element, a film for controlling a viewing angle and a polarization control element. The display device may be a three-dimensional (3D) display device. The 3D device may be a device for observing a three-dimensional image when an observer wears glasses for observing a 3D image (hereinafter referred to as "3D glasses"). In the device, a signal emitted from the display element is sequentially transmitted through the polarization control element and the film for controlling a viewing angle and then delivered to the observer, or sequentially transmitted through the film for controlling a viewing angle and the polarization control element and then delivered to the observer.

The display element may include a signal generating region for the right eye (hereinafter referred to as an "RS region") for generating a signal for the right eye (hereinafter referred to as an "R signal"), and a signal generating region for the left eye (hereinafter referred to as an "LS region") for generating a signal for the left eye (hereinafter referred to as an "L signal") in a driving state. The term "driving state" may refer to a state in which a 3D device displays an image, for example, a 3D image.

The display element may further include a light transmission control region (hereinafter referred to as a "TC region") adjacent to the RS and LS regions. The term "TC region" may refer to a region formed to block light incident to the region, or to absorb some of light incident to the region and transmit the other. For example, the TC region may refer to a region having a transmission rate of incident light, that is, a light transmission rate, of 0 to 20%, 0 to 15%, 0 to 10%, or 0 to 5%.

The "TC region adjacent to the RS and LS regions" may mean that the TC region present at such a position that, during delivery of the R and/or L signal(s) generated in the RS and/or LS regions to the polarization control element, at least a part of the R and/or L signal(s) is incident to the TC region to block the signal by the TC region, or transmit some of the signal through the TC region, and then delivered to the polarization control element when an image is observed at at least one angle within the range of a viewing angle.

The term "viewing angle" may refer to the range of an angle in which the L signal generated in the LS region may be transmitted through a signal polarization control region for the left eye (hereinafter, referred to as a "LG region") of the polarization control element, but not transmitted through a signal polarization control region for the right eye (hereinafter, referred to as a "RG region") and then delivered to the observer, or the range of an angle in which the R signal generated in the RS region may be transmitted through the RG region of the polarization control element but not transmitted through the LG region, and then delivered to the observer. At an angle exceeding the viewing angle, crosstalk phenomenon in which the L signal is transmitted through the RG region, or the R signal is transmitted through the LG region and then delivered to the observer, may occur, resulting in degrading an image quality.

In one embodiment, the TC region adjacent to the RS and LS regions may be disposed between the RS and LS regions. In one aspect in which the TC region is present between the RS and LS regions, the RS, TC and LS regions may be sequentially disposed on the same plane, or the TC region may be disposed on a top or bottom surface of the plane having the RS and LS regions. When the TC region is disposed on a top or bottom surface of the plane having the RS and LS regions, the TC region may be overlapped with at least a part of the RS and/or LS region when the device is observed from the front.

The polarization control element may include the RG and LG regions. For example, the RG region may be present at such a position that the R signal generated in the display element may be incident in a driving state. In addition, the LG region may be present at such a position that the L signal generated in the display element may be incident in a driving state.

The film for controlling a viewing angle may be present between the display element and the polarization control element or present at the polarization control element opposite to the display element. Accordingly, the display device may sequentially include the display element, the film for controlling a viewing angle and the polarization control element, or sequentially include the display element, the polarization control element and the film for controlling a viewing angle.

In the film for controlling a viewing angle, the TC region is formed. In the specification, for the convenience of description, the TC region included in the display element is referred to as a TC1 region, and the TC region formed in the film for controlling a viewing angle is referred to as a TC2 region.

The film for controlling a viewing angle may be included in the display device such that the TC2 region is adjacent to the RG and LG regions of the polarization control element. The TC2 region adjacent to the RG and LG regions may mean that the TC2 region present at such a location that, when an image is observed at at least one angle within the range of a viewing angle, a part of the R and/or L signal(s) delivered to the display element is incident to the TC2 region before the signal is incident to the RG and/or LG region(s) or after the signal is transmitted through the RG and/or LG region(s), and thereby the incident signal may be blocked by the TC2 region or a part of the incident signal may be transmitted through the TC2 region.

In one embodiment, the film for controlling a viewing angle may be disposed such that the TC2 region adjacent to the RG and LG regions is disposed between the RG and LG regions when the display device is observed from the front.

For example, the TC2 region may be overlapped with at least a part of the RG and/or LG region(s) when the display device is observed from the front.

FIGS. 1 and 2 schematically show illustrative 3D devices. In FIG. 1, the film for controlling a viewing angle 104 is disposed between the display element 103 and the polarization control element 105, and in FIG. 2, the film for controlling a viewing angle 104 is disposed outside the polarization control element 105. The illustrative 3D device as shown in FIG. 1 or 2 may include the display element 103, the film for controlling a viewing angle 104, and the polarization control element 105. The display device may further include a light source 101, a first polarizing plate 1021 and a second polarizing plate 1022 when necessary.

For example, as the light source 101, a direct-type or edge-type back light unit (BLU), which is conventionally used in a display device such as a liquid crystal display (LCD), may be used. As the light source 101, other than that, various kinds of devices may be used.

The first polarizing plate 1021 may be disposed between the light source 101 and the display element 103. Due to such arrangement, light emitted from the light source 101 may be incident to the display element 103 through the first polarizing plate 1021. The first polarizing plate 1021 may be an optical element having a light transmission axis and a light absorption axis perpendicular to the light transmission axis. When light is incident to the first polarizing plate 1021, among incident light, only light having a polarizing axis parallel to a direction of the light transmission axis of the polarizing plate 1021 may be transmitted.

The display element 103 may include the LS region capable of generating the L signal, and the RS region capable of generating the R signal in a driving state.

In one embodiment, the display element 103 may be a transmission-type liquid crystal panel including a liquid crystal layer present between two sheets of substrates. For example, the liquid crystal panel may include a first substrate, a pixel electrode, a first alignment layer, a liquid crystal layer, a second alignment layer, a common electrode and a second substrate, which are sequentially disposed from a side of the light source 101. For example, in the first substrate, an active driving circuit including a thin film transistor (TFT) as a driving element electrically connected with a transparent pixel electrode and an interconnection may be formed. The pixel electrode includes a metal oxide such as indium tin oxide (ITO), and thus may serve as an electrode per pixel. In addition, for example, the first or second alignment layer may serve to align liquid crystals of the liquid crystal layer. For example, the liquid crystal layer may include a vertical alignment (VA)-, twisted nematic (TN)-, super twisted nematic (STN)- or in plane switching (IPS)-mode liquid crystal. The liquid crystal layer may transmit or block light emitted from the light source 101 by pixel by a voltage applied from the driving circuit. The common electrode may serve as a common counter electrode.

In the display element 103, the LS and RS regions including at least one pixel as a region capable of generating the L or R signal in a driving state may be formed. For example, in the liquid crystal panel, at least one of unit pixels including liquid crystals sealed between the first and second alignment layers may form the LS or RS region. The LS and RS regions may be disposed in a column and/or row direction(s).

FIGS. 3 and 4 show illustrative arrangements of the RS and LS regions. FIGS. 3 and 4 may show arrangement of the RS and LS regions when the display device is observed from the front. In one embodiment, the RS and LS regions, as shown in FIG. 3, may have a stripe shape extending in the same direction, for example, a length direction, and closed and alternately disposed. In another embodiment, the RS and LS regions, as shown in FIG. 4, may be closely and alternately disposed in a lattice pattern. However, arrangement of the RS and LS regions are not limited to those in FIGS. 3 and 4, and various other designs may be applied. For example, the display element 103 may generate signals including the R and L signals by driving a pixel in each region in response to a signal in a driving state.

For example, referring to FIGS. 1 and 2, when light incident to the light source 101 is incident to the first polarizing plate 1021, only light polarized parallel to the light transmission axis of the polarizing plate 1021 is transmitted. The transmitted light is incident to the display element 103, and light incident to the display element 103 and then transmitted through the RS region may be converted into an R signal, and light incident to the display element 103 and then transmitted through the LS region may be converted into an L signal.

The display element 103 may include a TC1 region. The TC1 region may be adjacent to the RS and LS regions. In FIGS. 1 and 2, the TC1 region is disposed on a top surface of the plane having the RS and LS regions formed in the display element 103, and overlapped with a part of the RS and LS regions between the RS and LS regions when observed from the front. However, the position of the TC1 region is not limited to the arrangement shown in FIG. 1 or 2. For example, the TC1 region may be disposed on a back surface of the plane having the RS and LS regions, or on the same plane as that having the RS and LS regions. FIG. 5 shows the arrangement of the LS and RS regions shown in FIG. 3 again in consideration of the presence of the TC1 region, and FIG. 6 shows the arrangement of the LS and RS regions shown in FIG. 4 again in consideration of the presence of the TC1 region.

For example, the TC1 region may serve to observe an image of the display device at a wide viewing angle without loss of brightness along with the TC2 region of the film for controlling a viewing angle to be described below.

For example, the TC1 region may be a black matrix. For example, when the display element 103 is a transmission-type liquid crystal panel, the TC1 region, as described above, may be a black matrix included in a color filter usually present in the second substrate capable of being included in the liquid crystal panel.

In one embodiment, the TC1 region may be a region including chromium, a double layer of chromium and chromium oxide (Cr/CrOx double layer), carbon black, a resin layer including a pigment such as a carbon pigment or graphite. A method of forming the TC1 region using the above material is not particularly limited. For example, the TC1 region may be formed by a conventional method of forming a black matrix such as photolithography or a lift-off method.

For example, the second polarizing plate 1022, like the first polarizing plate 1021, is an optical element having a light transmission axis and a light absorption axis perpendicular to the light transmission axis, and may transmit only a signal having a polarization axis parallel to the direction of the transmission axis when light is incident. For example, the second polarizing plate 1022, as shown in FIGS. 1 and 2, may be disposed between the display element 103 and the polarization control element 105. The first and second polarization plates 1021 and 1022 included in the display device may be disposed such that the light absorption axes thereof are vertical to each other. The light transmission axes of the first and second polarizing plates 1021 and 1022 may be also vertical to each other. Here, "vertical" may mean substantially vertical, and for example, include an error within ±15, 10 or 5.

The RG and LG regions included in the polarization control element 105 are regions capable of controlling polarized states of the R and L signals, respectively. In one embodiment, the RG and LG regions may be regions serving to output the R and L signals having different polarized states from the display device.

In one embodiment, the RG region may be disposed such that the R signal generated and delivered from the RS region may be incident, and the LG region may be disposed such that the L signal generated and delivered from the LS region may be incident in a driving state. For example, while the RG and LG regions may have similar sizes to the RS and LS regions, respectively, and overlapped to each other when the display device is observed from the front, as long as the RG and LG regions are disposed at suitable positions to have such sizes that the R signal generated from the RS region may be incident to the RG region, and the L signal generated from the LS region may be incident to the LG region, they do not necessarily have similar sizes to or are not overlapped with the RS and LS regions.

For example, the RG and LG regions may be formed in a stripe shape extending in the same direction as each other in correspondence to the arrangement of the RS and LS regions of the display element 103, for example, a length direction, and closely and alternately disposed, or formed in a lattice pattern and closely and alternately disposed. For example, when the RS and LS regions are disposed as shown in FIG. 3, the RG and LG regions may be disposed in the same shape as shown in FIG. 7, and when the RS and LS regions are disposed as shown in FIG. 4, the RG and LG regions may be disposed in the same shape as shown in FIG. 8.

The R and L signals transmitted through the RG and LG regions, respectively, may be signals linearly polarized in a direction substantially perpendicular to each other. In another embodiment, one of the R and L signals respectively transmitted through the RG and LG regions is a left-circular polarized signal, and the other is a right-circular polarized signal. To this end, at least one of the LG and RG regions may include a phase retardation layer.

For example, to generate the left- and right-circular polarized signals, both of the RG and LG regions may include a phase retardation layer, the phase retardation layer included in the RG region and the phase retardation layer included in the LG region may be ¼ wavelength layers. To generate circular-polarized light revolved in opposite directions to each other, an optical axis of the ¼ wavelength layer disposed in the RG region may be differently formed from an optical axis of the ¼ wavelength layer disposed in the LG region. In one embodiment, the RG region includes a ¼ wavelength layer having an optical axis in a first direction, and the LG region may include a ¼ wavelength layer having an optical axis in a second direction different from the first direction as phase retardation layers. The term "n wavelength layer" used herein may refer to a phase retarding element capable of phase retarding incident light by n times of the wavelength of the light. Here, n may be ½, ¼ or ¾. In addition, the term "optical axis" used herein may refer to a slow axis or a fast axis when light is transmitted through a corresponding region, and for example, a slow axis.

The aspects of the RG and LG regions are not limited to those described above. For example, when one of the RG and LG regions includes a ¾ wavelength layer, and the other includes a ¼ wavelength layer, left- and right-circular polarized light may be generated.

In another embodiment, one of the RG and LG regions may be a ½ wavelength layer, and the other may be an optically isotropic region. In this case, the R and L signals respectively transmitted through the RG and LG regions may be output from the 3D device in the form of linearly polarized light to have polarization axes in a substantially vertical direction to each other.

The illustrative polarization control element may further include a base layer. In this case, the phase retardation layer such as the ¼, ¾ or ½ wavelength layer or the optically isotropic layer may be formed on the base layer. For example, the polarization control element may be included in the device such that the phase retardation layer is disposed on a side of the display element, and the base layer is disposed on a side of the observer.

For example, as a base layer, a glass or plastic base layer conventionally used in manufacturing an optical element may be used.

As a plastic base layer, a cellulose base layer including triacetyl cellulose (TAC) or diacetyl cellulose (DAC); a cyclo olefin polymer (COP) base layer including a norbornene derivative; an acryl base layer including poly(methyl methacrylate) (PMMA); a polycarbonate (PC) base layer; a polyolefin base layer such as polyethylene (PE) or polypropylene (PP); a polyvinyl alcohol (PVA) base layer; a poly ether sulfone (PES) base layer; a polyetheretherketon (PEEK) base layer; a polyetherimide (PEI) base layer; a polyethylenenaphthalate (PEN) base layer; a polyester base layer including polyethyleneterephthalate (PET); a polyimide (PI) base layer; a polysulfone (PSF) base layer; or a fluorine resin base layer including amorphous fluorine resin may be used. In one embodiment, a cellulose base layer such as a TAC base layer may be used.

The base layer may be a single-layered or multilayered structure, but to provide a thinner element, a single-layered structure. The thickness of the base layer is not particularly limited, and may be suitably controlled according to its use.

In one embodiment, the phase retardation layer capable of being formed on the base layer may include an alignment layer formed on the base layer, and a liquid crystal layer formed on the alignment layer. For example, the liquid crystal layer may be the ¼, ¾ or ½ wavelength layer, and the alignment layer under the liquid crystal layer may be a layer serving to control an optical axis of the wavelength layer. As the alignment layer, a conventional alignment layer known in the related art may be used. For example, the alignment layer may be an optical alignment layer having alignment determined by cis-trans isomerization, Fries rearrangement or dimerization, which is induced by irradiation of linearly polarized light, and capable of inducing alignment to an adjacent liquid crystal layer according to the determined alignment, a polymer layer such as a rubbing-treated polyimide layer, an alignment layer formed by an imprinting method such as nano imprinting, or a resin layer formed by patterning a plurality of groove regions.

The liquid crystal layer may be an optical crosslinked layer or an optical polymerized layer of an optical crosslinkable, or polymerizable liquid crystal compound. Various liquid crystal compounds having the above-described characteristics, for example, reactive mesogen (RM) produced by Merk or LC242 produced by BASF, are known in the related art.

A method of manufacturing a polarization control element is not particularly limited. Various methods of manufacturing a polarization control element are known in the related art, and every known method may be applied.

For example, the film for controlling a viewing angle 104 may be a film having a transparent region and the TC2 region. Accordingly, among light incident from one side of the film, light incident to the transparent region may be transmitted through the film, and light incident to the TC2 region may be blocked by the TC2 region or some of the light may be transmitted. FIG. 9 shows the film for controlling a viewing angle, which is observed from a side, and here, the transparent region is represented as P. In the film for controlling a viewing angle, for example, the transparent region P and the TC2 region may be formed in a stripe shape extending in the same direction as shown in FIG. 10, and closely and alternately disposed, or formed in a lattice pattern as shown in FIG. 11 and closely and alternately disposed when the film is observed from the front.

The film for controlling a viewing angle may be disposed between the polarization control element 105 and the display element 103, or outside the polarization control element 105. The film for controlling a viewing angle may be disposed such that the TC2 region is adjacent to the LG and RG regions. For example, the film for controlling a viewing angle may be disposed such that at least a part of the R and/or L signal(s) output from the display element 103 may be incident to the TC2 region before being incident to the RG and/or LG region (s), or after being transmitted through the RG and/or LG region(s) when observed at one angle within the viewing angle.

For example, the film for controlling a viewing angle may be disposed such that the TC2 region may be overlapped with at least a part of the LG and/or RG region(s) on the boundary between the LG and RG regions when the display device is observed from the front. FIG. 12 shows the arrangement of the LG and RG regions of FIG. 7 again in consideration of the presence of the TC2 region of the film for controlling a viewing angle, and FIG. 13 shows the arrangement of the LG and RG regions of FIG. 8 again in consideration of the presence of the TC2 region.

In one embodiment, the TC1 and TC2 regions may satisfy Expression 1. In the range satisfying Expression 1, brightness characteristics and the viewing angle of the display device may be suitably ensured.

$$-2 \times H_1 \leq H_2 \leq 2 \times H_1$$ [Expression 1]

In Expression 1, $H_1$ and $H_2$ are widths of the TC1 and TC2 regions, respectively.

Specific ranges of "$H_1$" and "$H_2$" may be suitably selected in consideration of the range satisfying Expression 1 according to the specification of the display device, and specific values thereof are not particularly limited. For example, $H_2$ may be in a range of more than 0 to 1,000 μm. For example, the lower limit of $H_2$ may be 20, 25, 30, 35, 40, 45, 50, 55, 60, 65, 70, 75 or 80 μm. In addition, for example, the upper limit of $H_2$ may be 900, 800, 700, 600, 500, 400, 300, 290, 280, 270, 260, 250, 240, 230, 220, 210 or 200 μm. Within the above-mentioned ranges of the upper and lower limits, the range of $H_2$ may be defined by selecting and combining various values.

For example, "$H_1$" may be selected in consideration of Expression 1 and the value of $H_2$, and in another embodiment, may have a value similar to a black matrix included in the conventional 3D device.

For example, the display device may have a relative brightness observed from the front of 60, 65 or 70% or more. The term "relative brightness" may refer to a ratio ($I_T/I_O$) of brightness ($I_T$) in the display device having the TC1 region and the film for controlling a viewing angle to brightness ($I_O$) in the display device having neither the TC1 region nor the film for controlling a viewing angle.

For example, in the display device, the film for controlling a viewing angle may be disposed to have all of the maximum values of the angle "$\theta_U$" satisfying Expression 2 and the angle "$\theta_L$" satisfying Expression 3 of 3, 5, 8, 8.5, 9, 9.5, 10, 10.5, 11, 11.5, 12, 12.5, 13, 13.5, 14, 14.5 or 15 degrees or more.

$$\tan \theta_U = (H_1 + 2y)/2T$$ [Expression 2]

$$\tan \theta_L = (H_1 + 2H_2 - 2y)/2T$$ [Expression 3]

In Expressions 2 and 3, $H_1$ is the width of the TC1 region, $H_2$ is the width of the TC2 region, T is the distance from the TC1 region of the display element to the TC2 region of the film for controlling a viewing angle, and y is the distance from a point at which an imaginary normal line of a line bisecting the width of the TC1 region with respect to a surface of the TC1 region is in contact with the TC2 region to a part in which the TC2 region is present.

Expressions 2 and 3 will be described below with reference to FIGS. 14 and 15.

Considering that the term "viewing angle" refers to a range of an angle in which the L signal may be delivered to the observer through the LG region but not through the RG region, or a range of an angle in which the R signal may be delivered to the observer through the RG region but not through the LG region, the viewing angles are represented as "$\theta_U$" and "$\theta_L$" in FIGS. 14 and 15.

As shown in FIGS. 14 and 15, the viewing angles may be determined according to the distance T from the TC1 region to the TC2 region and the widths of the TC1 and TC2 regions. For example, the distance T may be a distance from a surface of the TC1 region facing the polarization control element 105 to a surface of the TC2 region facing the display element 103.

The distance T is determined according to the specification of the display device, and is not particularly limited. For example, the distance T may be 5 nm or less, or approximately 0.5 to 5 mm.

Referring to FIGS. 14 and 15, it is seen that the viewing angles "$\theta_U$" and "$\theta_L$" are determined according to the widths $H_1$ and $H_2$ of the TC1 and TC2 regions, and relative positions of the TC1 and TC2 regions when the distances T are the same as each other.

Referring to FIGS. 14 and 15, it is seen that the viewing angle "$\theta_U$" is formed for $\tan \theta_U$ to be the same as a value obtained by dividing the sum ($H_1/2+y$) of a value of half of the width $H_1$ of the TC1 region and the distance y from a point at which an imaginary normal line C of a line bisecting the width of the TC1 region with respect to a surface of the TC1 region or display element 103 is in contact with the TC2 region to a part in which the TC2 region is present by the distance T. In addition, it is seen that the viewing angle "$\theta_L$" is formed for $\tan \theta_L$ to be the same as a value obtained by dividing the sum ($H_1/2+y$) of a value of half of the width $H_1$ of the TC1 region and a value ($H_2-y$) obtained by subtracting the distance y from a point at which an imaginary normal line C of a line bisecting the width $H_1$ of the TC1 region with respect to a surface of the TC1 region or display element 103 from the width $H_2$ of the TC2 region is in contact with the TC2 region to a part in which the TC2 region is present by the distance T.

In the display device having the TC1 and TC2 regions, sizes, for example, the widths of the TC1 and TC2 regions, and the relative positions of the TC1 and TC2 regions may be suitably controlled, thereby ensuring a wide viewing angle and excellent brightness characteristics when a 3D image is observed.

The illustrative display device may have relative brightness observed from the front of 60, 65 or 70% or more, and all of the maximum values of the angle "$\theta_U$" satisfying Expression 2 and the maximum values of the angle "$\theta_L$" satisfying Expression 3 may be 3, 5, 7, 8.5, 9, 9.5, 10, 10.5, 11, 11.5, 12, 12.5, 13, 13.5, 14, 14.5 or 15 degrees or more.

In another aspect, a film for controlling a viewing angle, for example, a film for controlling a viewing angle used in the display device described above, is provided. Detailed description about the film for controlling a viewing angle may be the same as described above. For example, as shown in FIG. 9, the film for controlling a viewing angle may include a transparent region P and a TC2 region, which may be formed in a stripe shape extending in the same direction as shown in FIG. 10 and closely and alternately disposed, or formed in a lattice pattern as shown in FIG. 11 and closely and alternately disposed when the film is observed from the front.

The film for controlling a viewing angle may include a transparent base layer and a light blocking or absorbing pattern formed on the base layer. FIG. 16 shows an illustrative film for controlling a viewing angle 900 including a transparent transparent base layer. In one embodiment, the x axis may be a direction parallel to a slow axis of the transparent base layer, and the y axis may be a direction parallel to a fast axis of the transparent base layer.

In still another aspect, an optical filter, for example, an optical filter for a 3D display device is provided. The illustrative optical filter may include the polarization control element; and the film for controlling a viewing angle disposed on one surface of the polarization control element. For example, the optical filter may include a polarization control element including first and second regions formed to divide incident light into at least two kinds of light having different polarized states, and a film for controlling a viewing angle disposed on one surface of the polarization control element, and including a transparent region and a TC2 region.

Detailed descriptions about the polarization control element and the film for controlling a viewing angle may be the same as described above. In this case, one of the first and second regions of the polarization control element may be the RG region, and the other may be the LG region. The RG and LG regions are described above. Accordingly, the first and second regions may be formed in a stripe shape extending in the same direction as shown in FIG. 7 and closely and alternately disposed, or formed in a lattice pattern as shown in FIG. 8 and closely and alternately disposed, when observed from the front.

In addition, for example, the film for controlling a viewing angle may be disposed on one surface of the polarization control element such that the TC2 region is disposed on the boundary between the first and second regions, and overlapped with a part of the first and/or second regions when the optical filter is observed from the front as shown in FIGS. 12 and 13.

BRIEF DESCRIPTION OF THE DRAWINGS

FIGS. 3 and 4 are schematic views of illustrative arrangements of LS and RS regions;

FIGS. 7 and 8 are schematic views of illustrative arrangements of LG and RG regions;

FIGS. 10 and 11 show illustrative arrangements of transparent and TC2 regions of the film for controlling a viewing angle;

DETAILED DESCRIPTION OF EXEMPLARY EMBODIMENTS

Hereinafter, a display device will be described in detail with reference to Examples and Comparative Example, but the device is not limited thereto.

EXAMPLES 1 TO 4

Figure 1:
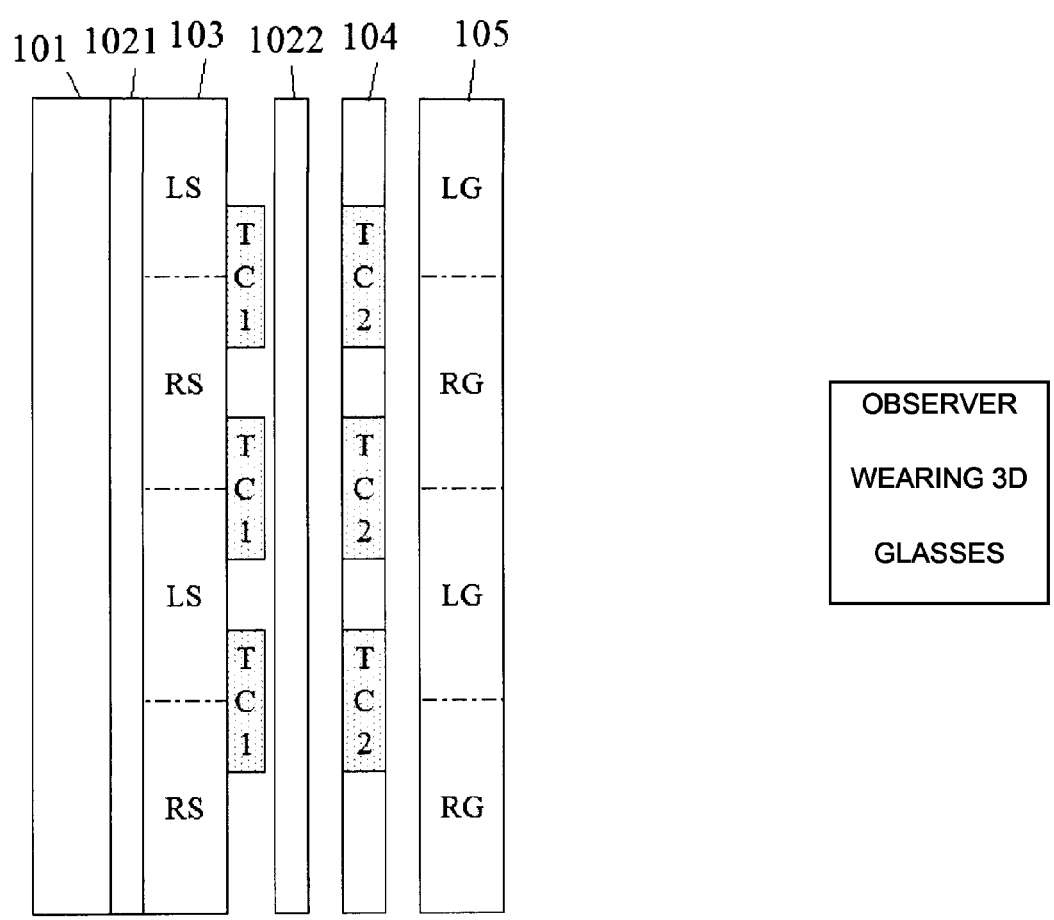
FIGS. 1 and 2 show illustrative display devices.
Figure 2:
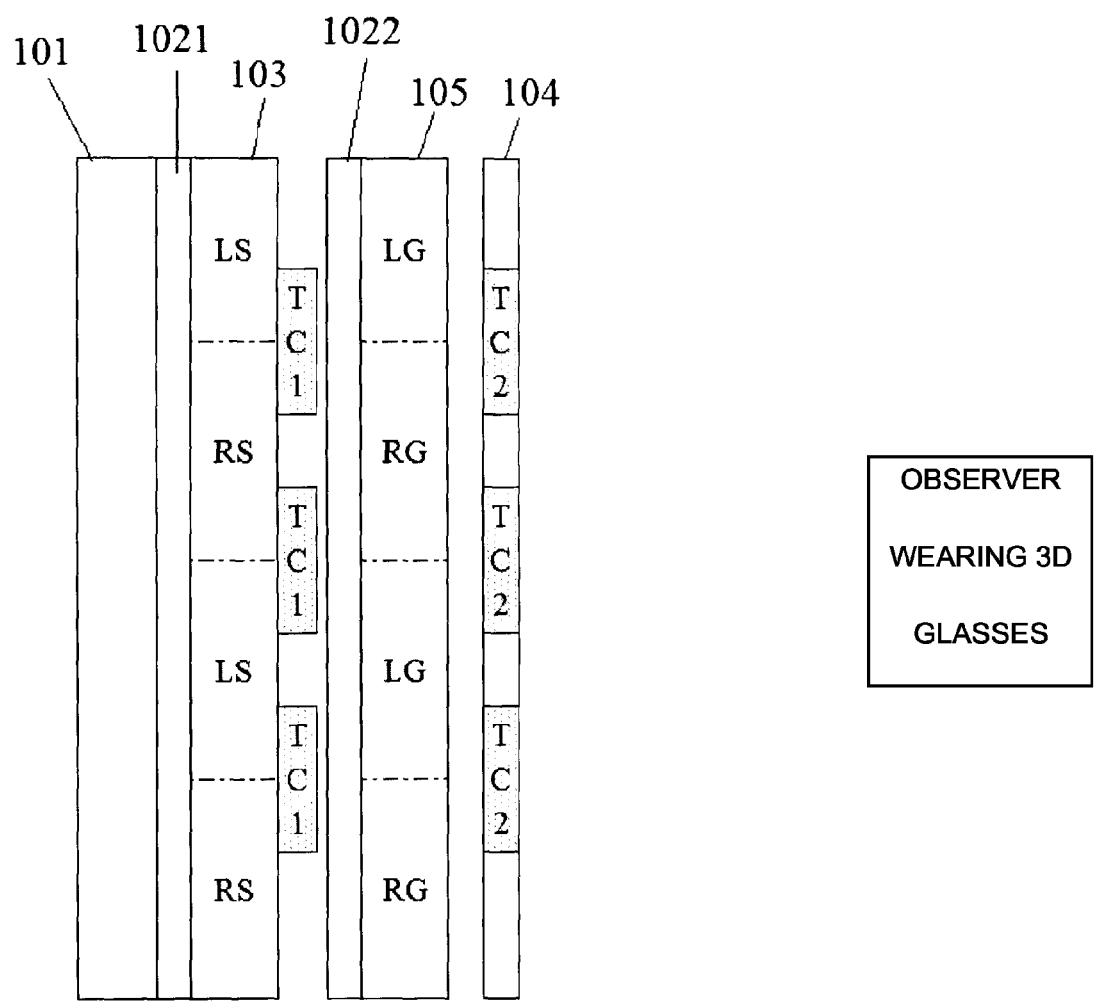
Figure 3:
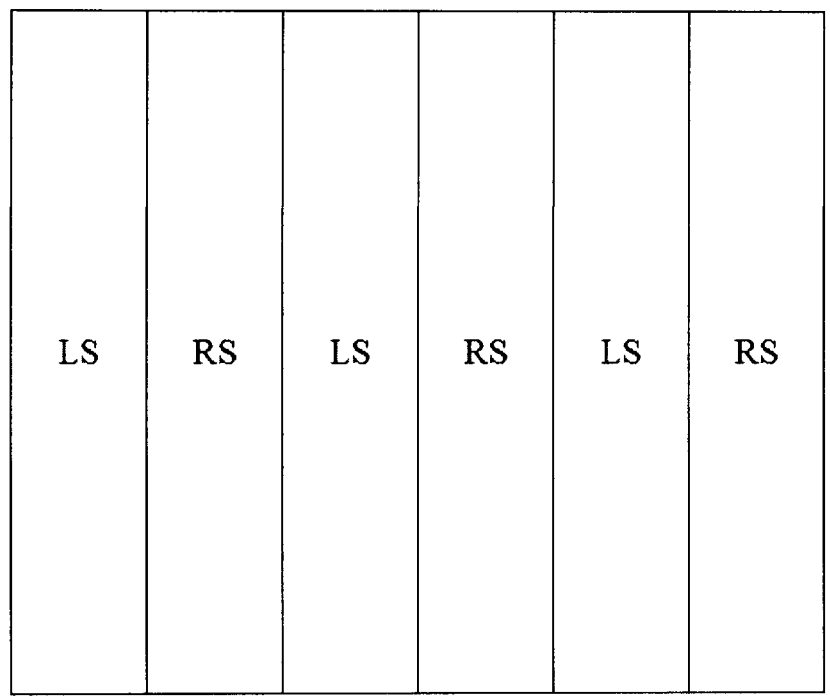
Figure 5:
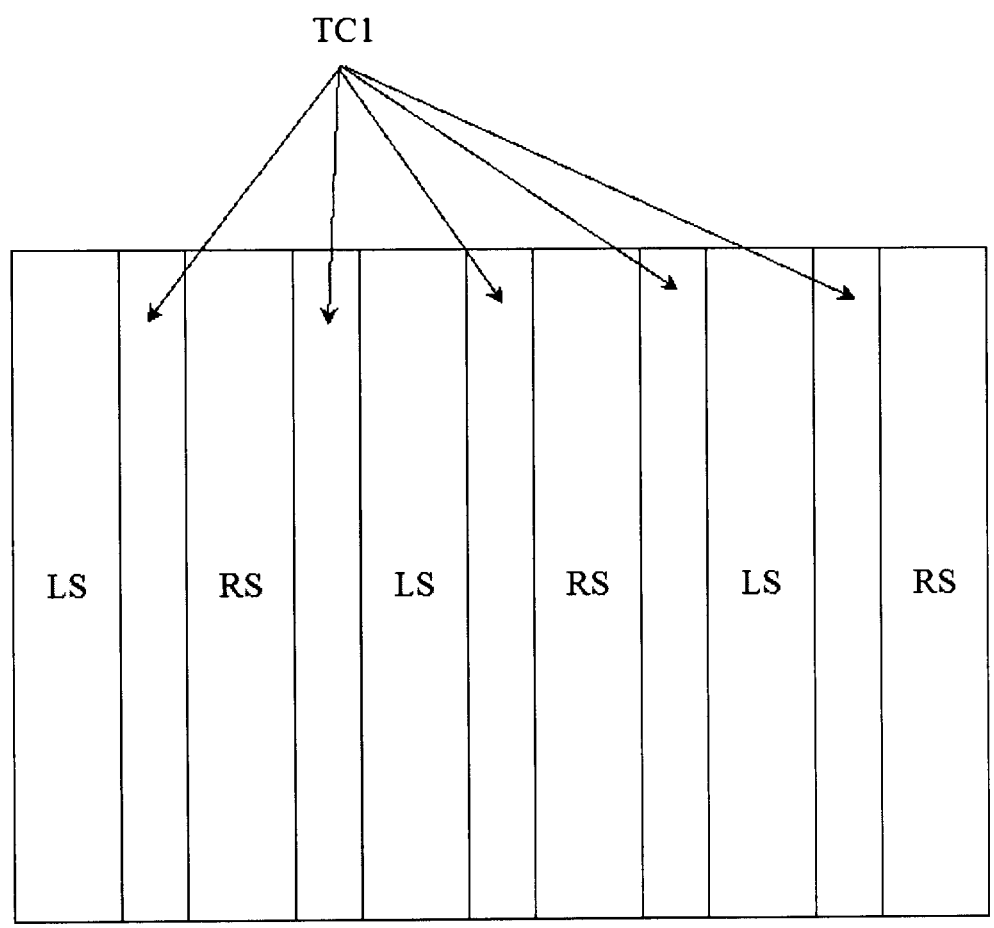
FIGS. 5 and 6 are schematic views of illustrative arrangements of LS, RS and TC1 regions.
Figure 6:
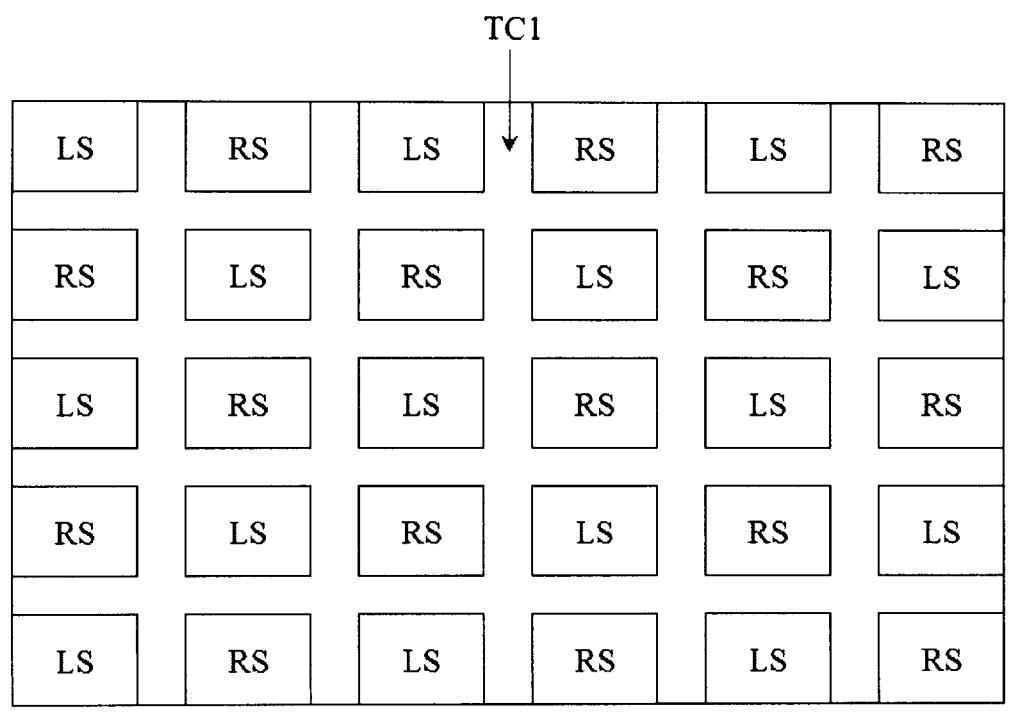
Figure 7:
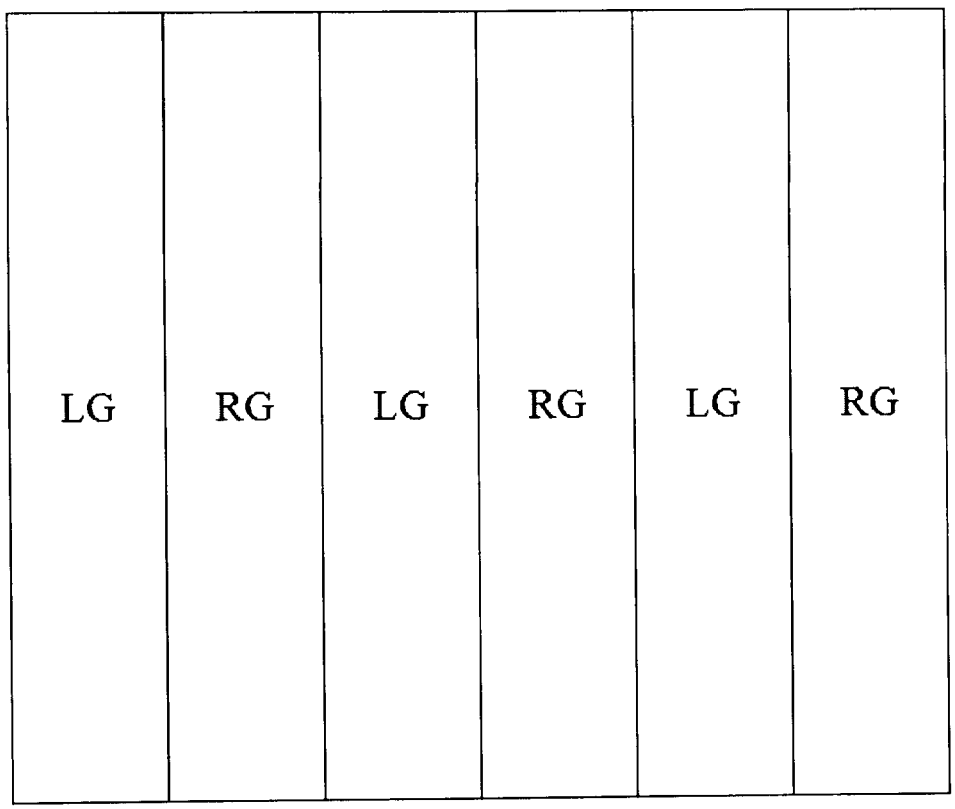
Figure 9:
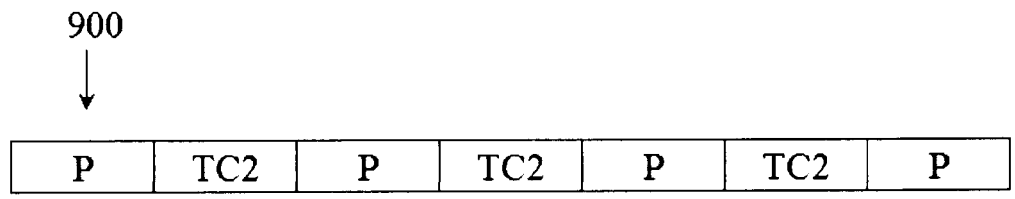
FIG. 9 shows an illustrative film for controlling a viewing angle.
Figure 10:
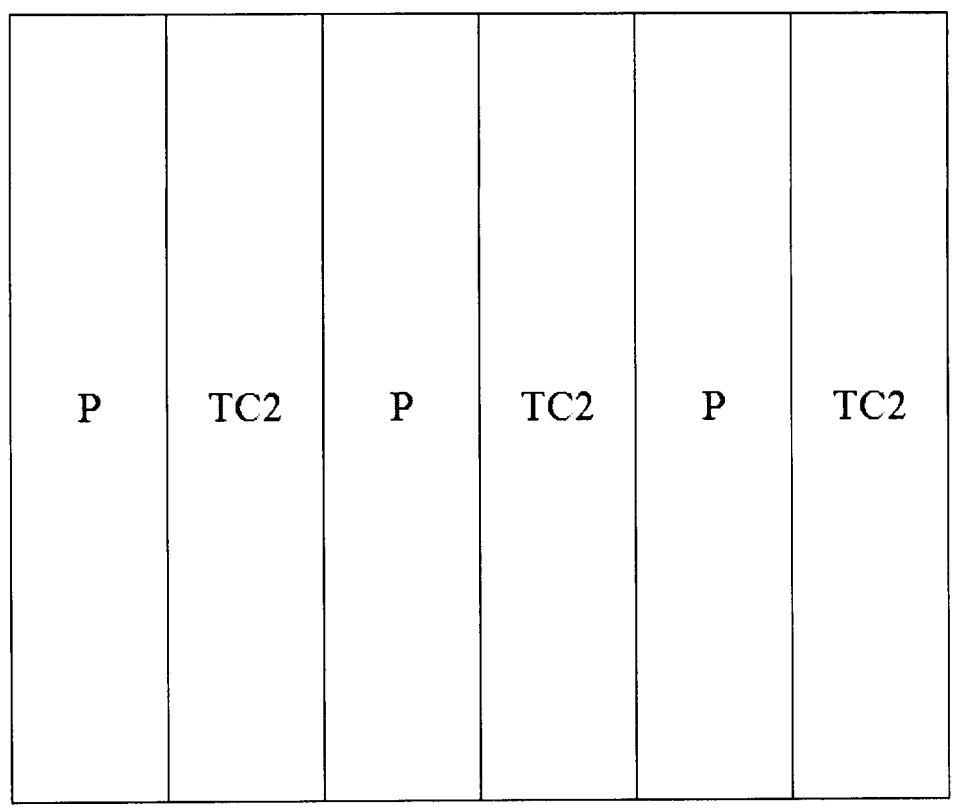
Figure 12:
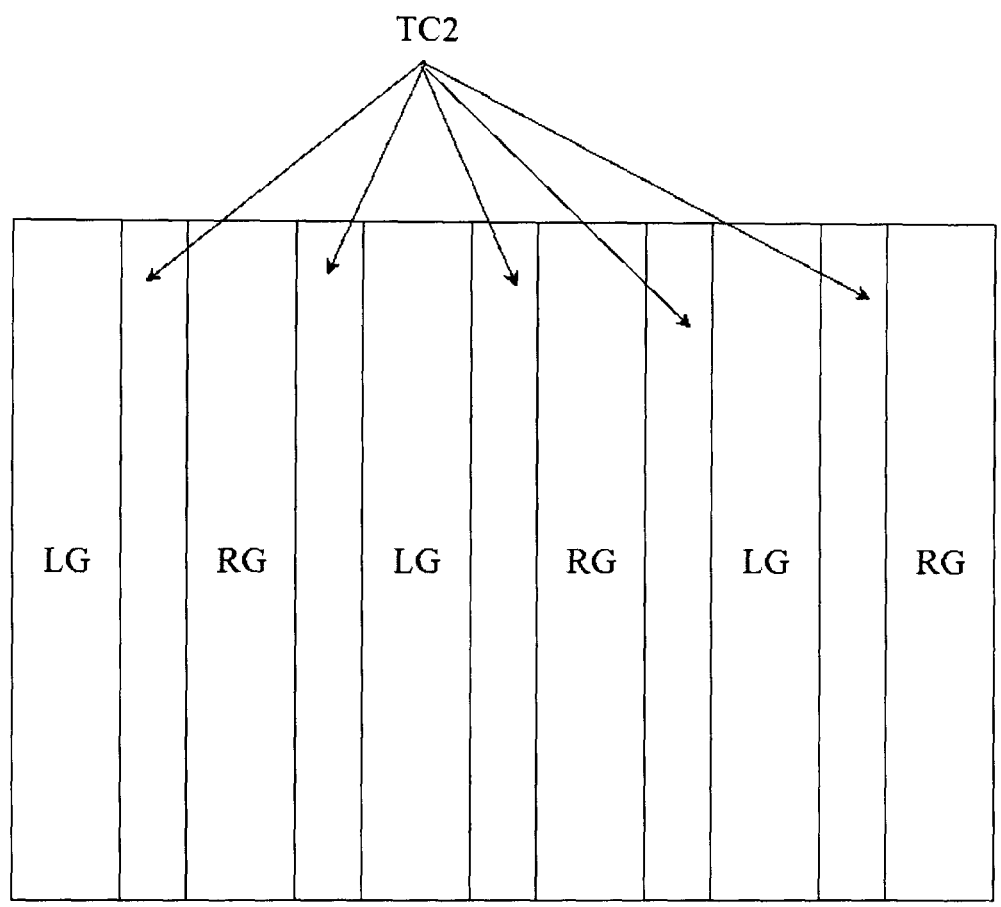
FIGS. 12 and 13 are schematic views of illustrative arrangements of LG, RG and TC2 regions.
Figure 13:
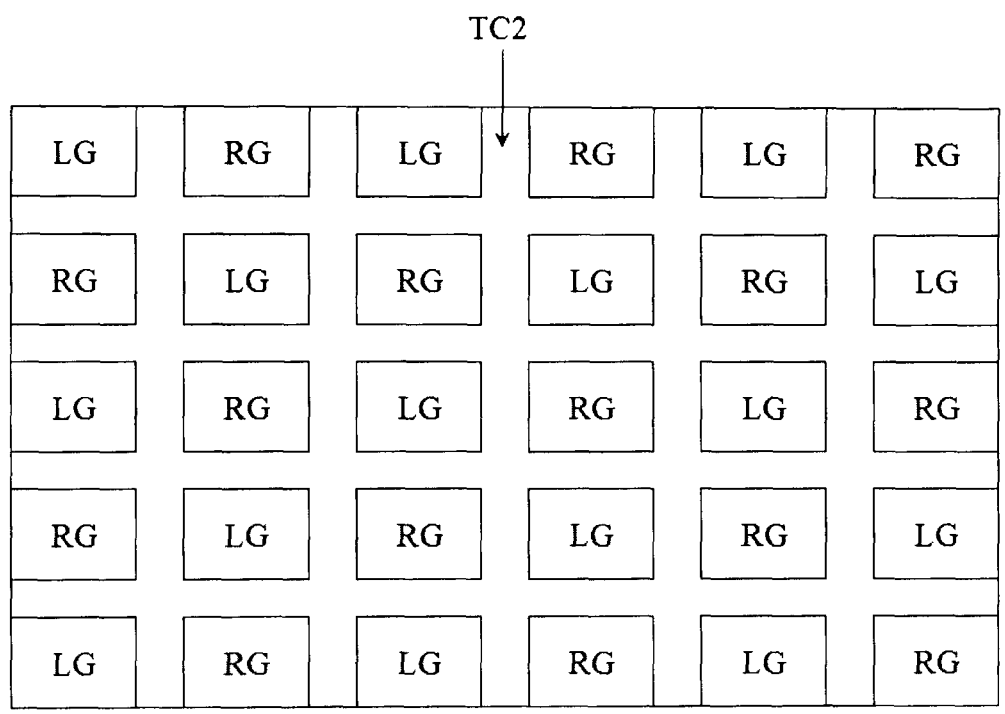
Figure 14:
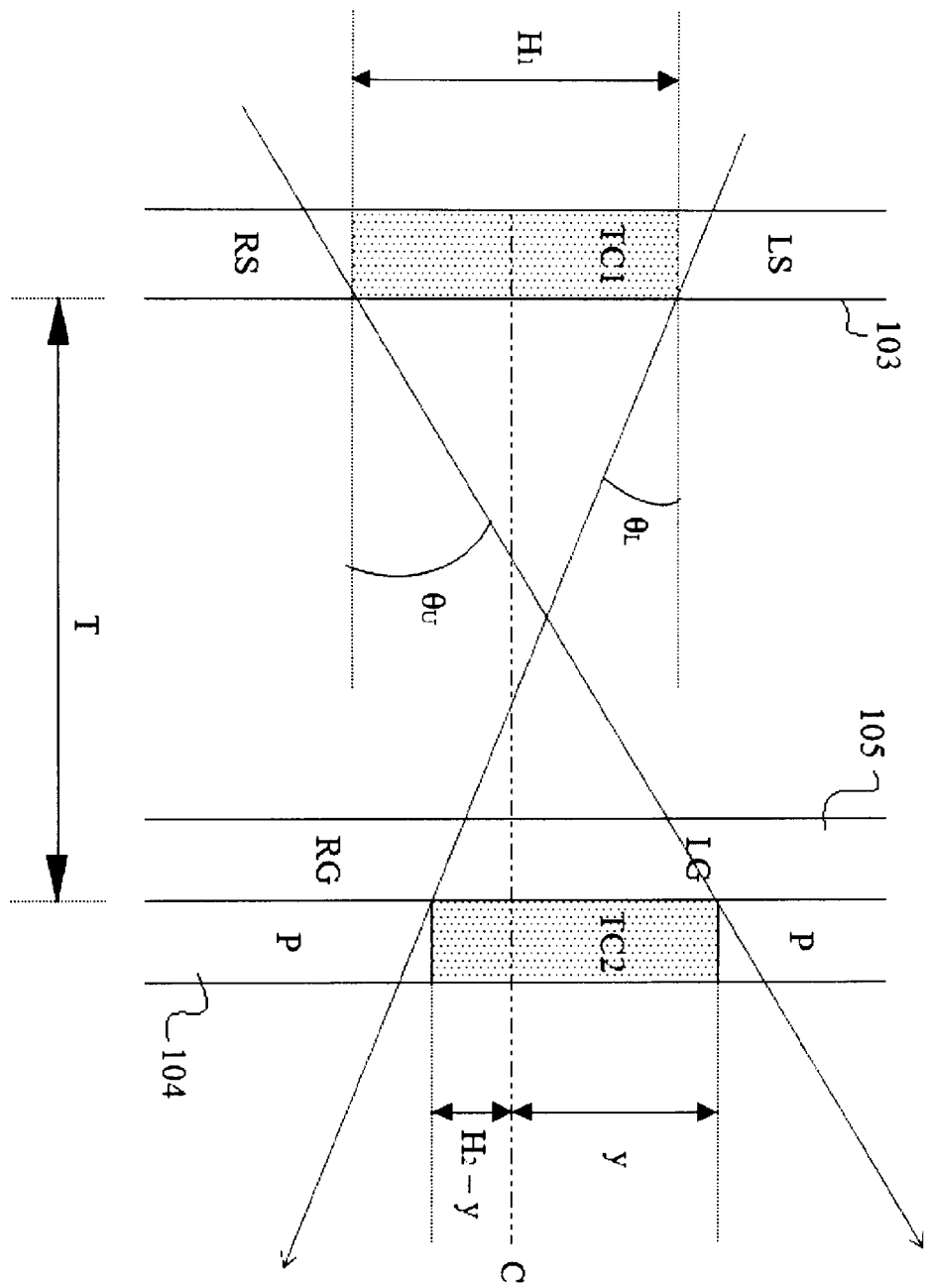
FIGS. 14 and 15 schematically show a viewing angle of the display device.
Figure 15:
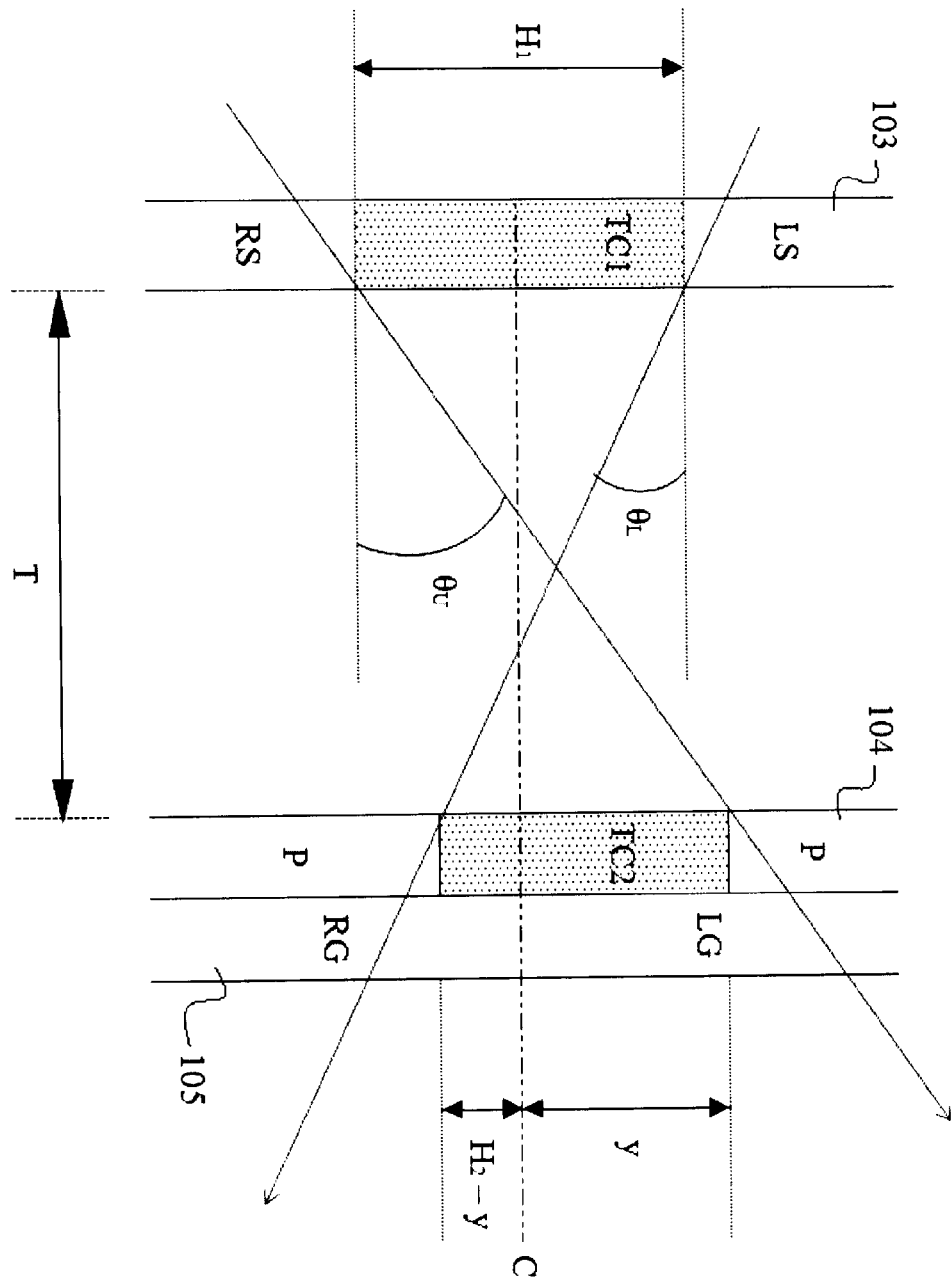
Figure 16:
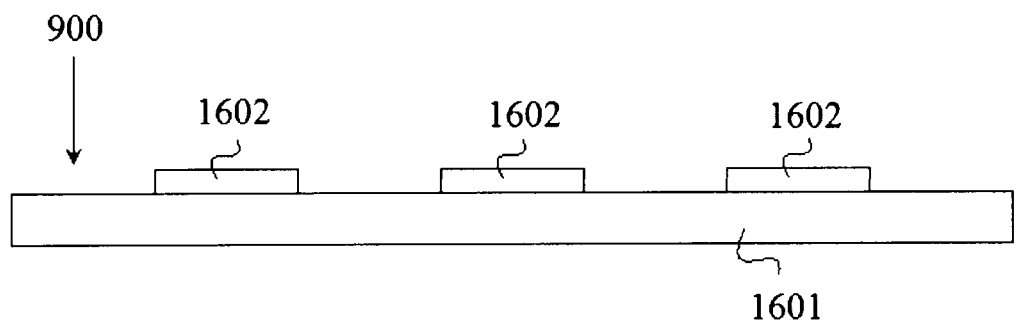
FIG. 16 shows the illustrative film for controlling a viewing angle.
Figure 17:
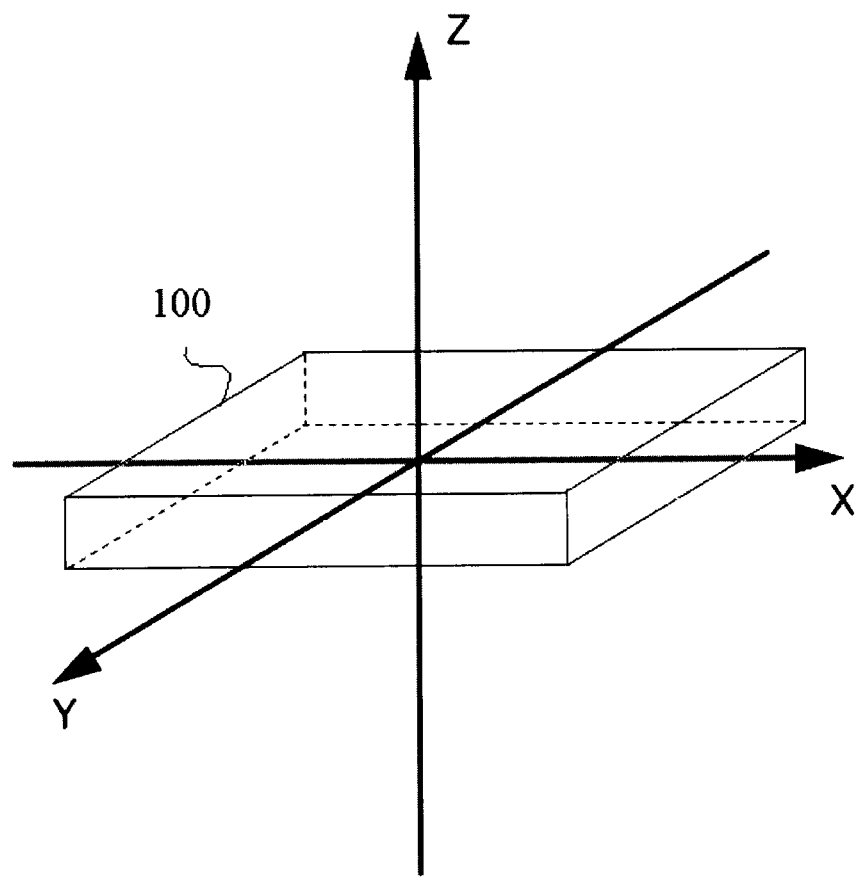
FIG. 17 is a schematic view for determining x, y and z axes of a transparent base layer.
Figure 18:
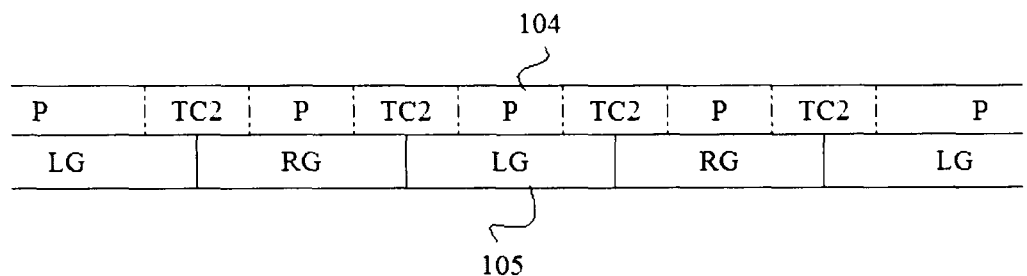
FIG. 18 shows an illustrative optical filter.

A device was configured to have a structure shown in FIG. 1 and include a transmission-type liquid crystal panel as a display element 103. As the liquid crystal panel, a panel formed such that RS and LS regions were disposed as shown in FIG. 3, and a TC1 region is formed by a black matrix of a color filter of the liquid crystal panel and overlapped with a part of the RS and LS regions between the RS and LS regions as shown in FIG. 5, was used. The TC1 region was formed to have the same range of overlapping the TC1 region with the RS region as a range of overlapping the TC1 region with the LS region. In addition, the RG and LG regions of the polarization control element 105 were disposed as shown in FIG. 7. As a film for controlling a viewing angle 104, a film formed by printing light blocking ink on a surface of a triacetyl cellulose (TAC) film having an in-plane phase retardation of 10 nm or less and a phase retardation in a thickness direction of 50 nm or less as a transparent base to form a TC2 region as shown in FIG. 10, was used, and then disposed between a polarization control element 105 and a second polarizing plate 1022 as shown in FIG. 1. Here, the TC2 region of the film for controlling a viewing angle 104 was formed to be overlapped with a part of RG and LG regions between the RG and LG regions as shown in FIG. 12, and to have the same range of overlapping the TC2 region with the RG region as a range of overlapping the TC2 region with the LG region (that is, referring to FIG. 15, the film for controlling a viewing angle was disposed to have y of $H_2/2$). In the device, a phase retardation layer (¼ wavelength layer), which had a slow axis in a direction having 45 degrees with an absorption axis of the second polarizing plate 1022 in a counter-clockwise direction, was disposed in the RG region, and a phase retardation layer (¼ wavelength layer), which had a slow axis in a direction having 45 degrees with the absorption axis of the second polarizing plate 1022 in a clockwise direction, was disposed in the LG region, and the absorption axes of the first and second polarizing plates 1021 and 1022 are vertical to each other. The distance between the TC1 and TC2 regions (T in FIG. 15) was approximately 1 mm, the sum of widths of the LG and RG regions was approximately 545 μm, and the widths of the LG and RG regions were approximately the same as each other. In the device, to ensure the maximum viewing angle ("$\theta_U$" or "$\theta_L$") of approximately 13.5 degrees in every illustrative embodiment, the widths ($H_1$ and $H_2$) of the TC1 and TC2 regions were controlled. In this case, the widths ($H_1$ and $H_2$) of the TC1 and TC2 regions in each Example were changed as shown in Table 1 and the device was driven, and then relative brightness according to each viewing angle ("$\theta_U$" or "$\theta_L$") was measured using a brightness meter (SR-UL2 Spectrometer). The results are listed in Table 1.

TABLE 1

| | Example | | | |
|---|---|---|---|---|
| | 1 | 2 | 3 | 4 |
| $H_1$ (unit: μm) | 210 | 180 | 150 | 120 |
| $H_2$ (unit: μm) | 30 | 60 | 90 | 120 |
| $H_1 + H_2$ (unit: μm) | 240 | 240 | 240 | 240 |
| Viewing Angle (unit: degree) | Relative Brightness (unit: %) | | | |
| 0 | 61.1 | 66.7 | 72.5 | 78 |
| 2 | 61.1 | 66.7 | 72.5 | 74.8 |
| 4 | 61.1 | 66.7 | 69.3 | 71.6 |
| 6 | 61.1 | 66.7 | 66.1 | 68.4 |
| 8 | 61.1 | 65 | 62.9 | 65.2 |
| 10 | 61.1 | 62.2 | 62 | 61.9 |
| 12 | 58.3 | 59 | 58.8 | 58.7 |
| 13 | 56 | 56 | 56 | 56 |

COMPARATIVE EXAMPLE 1

A device was configured as described in Examples 1 to 4 except that the film for controlling a viewing angle 104 was not used. As described in Examples, the device was configured by controlling the width of the TC1 region to 240 μm to ensure the maximum viewing angle ("$\theta_U$" or "$\theta_L$") of approximately 13.5 degrees. While the device was driven, relative brightness according to each viewing angle ("$\theta_U$" or "$\theta_L$") was measured using a brightness meter (SR-UL2 Spectrometer). The results are listed in Table 2.

TABLE 2

| | Comparative Example 1 |
|---|---|
| $H_1$ (unit: μm) | 240 |
| $H_2$ (unit: μm) | 0 |
| $H_1 + H_2$ (unit: μm) | 240 |
| Viewing Angle (unit: degree) | Relative Brightness (unit: %) |
| 0 | 56 |
| 2 | 56 |
| 4 | 56 |
| 6 | 56 |
| 8 | 56 |
| 10 | 56 |
| 12 | 56 |
| 13 | 56 |

When the illustrative display device, film for controlling a viewing angle or optical filter is used, a 3D image can be observed at a wide viewing angle without loss of brightness.

What is claimed is:

1. A display device, comprising:
   a display element comprising signal generating regions for right and left eyes, configured to generate signals for right and left eyes, respectively, and a first light transmission control (TC1) region adjacent to the signal generation regions for the right and left eyes;
   a polarization control element comprising a signal polarization control region for the right eye disposed at a position on which the signal for a right eye is incident, and a signal polarization control region for the left eye disposed at a position on which the signal for the left eye is incident; and
   a film for controlling a viewing angle that is present between the polarization control element and the display element, or outside of the polarization control element, comprises a second light transmission control (TC2) region formed to be adjacent to the signal polarization control regions for right and left eyes, and is disposed so that the maximum values of an angle ($\theta_U$) satisfying Expression 2 and an angle ($\theta_L$) satisfying Expression 3 are 3 degrees or more:

$$\tan \theta_U = (H_1 + 2y)/2T \qquad \text{[Expression 2]}$$

$$\tan \theta_L = (H_1 + 2H_2 - 2y)/2T \qquad \text{[Expression 3]}$$

where $H_1$ is the width of the TC1 region, $H_2$ is the width of the TC2 region, T is the distance from the TC1 region of the display element to the TC2 region of the film for controlling a viewing angle, and y is the distance from a point at which an imaginary normal line of a line bisecting the width of the TC1 region with respect to a surface of the TC1 region is in contact with the TC2 region to a part in which the TC2 region is present.

2. The display device according to claim 1, wherein the TC1 and TC2 regions have a light transmission rate in the range from 0 to 20%, respectively.

3. The display device according to claim 1, wherein, when observed from the front, the TC1 region is disposed on the boundary between the signal generating regions for right and left eyes, and overlapped with at least a part of the signal generating region for the right or left eye.

4. The display device according to claim 1, wherein, when observed from the front, the film for controlling a viewing angle is disposed such that the TC2 region is disposed on the boundary between the signal polarization control regions for right and left eyes, and overlapped with at least a part of the signal polarization control region for the right or left eye.

5. The display device according to claim 1, wherein the TC1 region comprises chromium, a double layer of chromium and chromium oxide, a resin layer including a pigment, or graphite.

6. The display device according to claim 1, wherein relative brightness observed from the front is 60% or more.

7. The display device according to claim 1, wherein the film for controlling a viewing angle comprises a transparent base layer and a light blocking or absorbing pattern formed on the base layer, and the TC2 region is formed by the light blocking or absorbing pattern.

8. The display device according to claim 7, wherein the light blocking or absorbing pattern comprises a light blocking or absorbing inorganic pigment, or a light blocking or absorbing organic pigment.

9. The display device according to claim 7, wherein the transparent base layer has an in-plane phase retardation with respect to light having a wavelength of 550 nm in the range of 50 nm or less.

10. The display device according to claim 7, wherein the transparent base layer has a phase retardation in a thickness direction with respect to light having a wavelength of 550 nm in the range of 200 nm or less.

* * * * *